United States Patent
Vigneau et al.

(10) Patent No.: US 9,529,070 B2
(45) Date of Patent: Dec. 27, 2016

(54) RADIONAVIGATION SIGNAL TRACKING DEVICE

(71) Applicants: Centre National d'Etudes Spatiales, Paris (FR); M3SYSTEMS, Lavernose Lacasse (FR)

(72) Inventors: Willy Vigneau, Muret (FR); Nabil Jardak, Muret (FR); Philippe Paimblanc, Toulouse (FR); Anchalee Puengnim, Nuremberg (DE); Lionel Ries, Viviers les Montages (FR)

(73) Assignees: CENTRE NATIONAL D'ETUDES SPATIALES, Paris (FR); M3SYSTEMS, Lavernose Lacasse (FR)

( * ) Notice: Subject to any disclaimer, the term of this patent is extended or adjusted under 35 U.S.C. 154(b) by 409 days.

(21) Appl. No.: 14/152,235

(22) Filed: Jan. 10, 2014

(65) Prior Publication Data
US 2014/0191903 A1 Jul. 10, 2014

(30) Foreign Application Priority Data

Jan. 10, 2013 (FR) .................................. 13 50211

(51) Int. Cl.
  *G01S 19/29* (2010.01)
  *G01S 1/02* (2010.01)
  *G01S 19/44* (2010.01)
(52) U.S. Cl.
  CPC .................. *G01S 1/02* (2013.01); *G01S 19/29* (2013.01); *G01S 19/44* (2013.01)
(58) Field of Classification Search
  CPC ............. G01S 19/29; G01S 1/02; G01S 19/44

USPC ...................................................... 342/357.68
See application file for complete search history.

(56) References Cited

U.S. PATENT DOCUMENTS

| | | | |
|---|---|---|---|
| 3,883,873 A | 5/1975 | Mosyakov et al. | |
| 4,097,805 A * | 6/1978 | Fujii | H04B 1/50 455/183.1 |
| 5,311,149 A * | 5/1994 | Wagner | H03D 7/163 331/1 A |
| 2003/0058163 A1 | 3/2003 | Zimmerman et al. | |
| 2005/0101248 A1 | 5/2005 | Vollath | |
| 2010/0079333 A1* | 4/2010 | Janky | G01S 19/43 342/357.24 |

(Continued)

OTHER PUBLICATIONS

U. Vollath, "Analysis of Three-Carrier Ambiguity Resolution Technique for Precise Relative Positioning in GNSS-2", Navigation: Journal of the Institute of Navigation, Vo.46, No, , Spring 1999, pp. 13-23.

*Primary Examiner* — Harry Liu
(74) *Attorney, Agent, or Firm* — Cantor Colburn LLP

(57) ABSTRACT

A radionavigation signal tracking device comprises a first and a second tracking stage for radionavigation signals. The first tracking stage comprises a first carrier phase-locked loop. The latter produces a first error signal arising from a phase difference between the first carrier and its replica. The phase of the replica of the first carrier is adjusted with the first error signal. The second tracking stage comprises a second carrier phase-locked loop. The latter produces a second error signal arising from a difference between the first phase difference and a phase difference between the second carrier and the replica thereof. The phase of the replica of the second carrier is adjusted with the first and second error signals.

19 Claims, 4 Drawing Sheets

(56) References Cited

U.S. PATENT DOCUMENTS

| | | | |
|---|---|---|---|
| 2010/0208775 A1* | 8/2010 | Weill | G01S 19/37 375/150 |
| 2011/0298661 A1* | 12/2011 | Buck | G01S 19/26 342/357.32 |
| 2012/0121087 A1* | 5/2012 | Psiaki | G01S 19/05 380/255 |
| 2014/0062771 A1* | 3/2014 | Lebrat | G01S 19/43 342/357.26 |

* cited by examiner

RADIONAVIGATION SIGNAL TRACKING DEVICE

FIELD OF THE INVENTION

The present invention relates to the field of radionavigation, more specifically to a device for tracking a radionavigation signal (or radioelectric navigation signal). The field of application of the invention is in particular the reception of radionavigation signals transmitted by satellite positioning system transmitters (known for short as GNSS or "Global Navigation Satellite System"), for example GPS ("Global Positioning System"), Galileo, Glonass, QZSS, Compass, IRNSS, etc.

BACKGROUND OF THE INVENTION

Generally, the radionavigation signals transmitted by the satellites (or pseudolites) of a positioning system take the form of a carrier modulated by a spreading waveform containing a pseudo-random binary code. Since modulating the carrier causes spreading of the spectrum around the frequency of the carrier, radionavigation signals are frequently referred to as "spread-spectrum". The pseudo-random codes constitute an identifier of the signal and therefore of the transmitting satellite. Known to the receivers, said codes provide the receivers with Code Distribution Multiple Access (CDMA). Incidentally, certain satellite positioning signals may also carry useful data (for example the navigation message) in the form of a binary sequence (at a substantially lower rate than the pseudo-random code) additionally modulated on the carrier. This payload of useful data will be disregarded hereafter.

In the case of GPS, radionavigation signals are transmitted in the L1 frequency band, centered on 1575.42 MHz, the L2 frequency band, centered on 1227.6 MHz and the L5 frequency band, centered on 1176.45 MHz. The satellites of the European GNSS (also known as "Galileo") will transmit in the bands: E2-L1-E1 (the median band portion L1 being the same as that for GPS), E5a (which, according to Galileo nomenclature, is the L5 band provided for GPS), E5b (centered on 1207.14 MHz) and E6 (centered on 1278.75 MHz). Hereafter, the E5a and E5b bands will be treated together as the E5 band, with 1191.795 MHz as the central frequency. In the case of Galileo's open signals, a complete description may be found in "Galileo Open Service Signal-In-Space Interface Control Document", or Galileo OS SIS ICD, available on the website http://ec.europa.eu/enterprise/policies/satnav/galileo/open-service/Index_en.htm. It may also be noted that the satellites of the Compass constellation transmit or will transmit in band B1 (centered on 1561.098 MHz), B1-2 (centered on 1589.742 MHz), L1 (centered on 1575.42 MHz), B2 (centered on 1207.14 MHz) and B3 (centered on 1268.52 MHz). The GLONASS system uses the central frequencies 1602 MHz and 1246 MHz. The stated central frequencies are the frequencies of the carriers of the various signals.

Receiving a radionavigation signal normally involves multiplying the received signal by an internal replica of the carrier generated in the receiver by an oscillator driven by a carrier tracking loop and another multiplication by an internal replica of the spreading waveform produced by a waveform generator driven by a spreading waveform tracking loop (also known as a "code tracking loop"). The error or servo signals of the carrier and spreading waveform tracking loops are used by the receiver to determine its position. The signal representing the phase difference between the carrier of the received signal and the internal carrier replica produced at each time step by the carrier tracking loop provides a first measurement or observable (the phase measurement or observable). The time offset signal between the spreading waveform of the received signal and the internal spreading waveform replica produced at each time step by the spreading waveform tracking loop represents a second measurement or observable (the code measurement or observable).

The phase observable is not used by all receivers. Inexpensive receivers in particular determine their position solely on the basis of code observations. Phase measurements are implemented, for example, in the RTK ("Real Time Kinematic") and PPP ("Precise Point Positioning") methods.

Code measurements have meter-level accuracy while phase measurements have an accuracy of a few mm. However, phase measurements have the major drawback of being ambiguous in that the number of integer cycles between the satellite and the receiver is unknown at the outset. Phase measurements are modulo one cycle and only provide the real part of the carrier phase difference between transmission by the satellite and the receiver. In order to be able to benefit from the accuracy of phase measurements, a receiver must be able to resolve the ambiguities associated therewith.

Carrier phase tracking of a radionavigation signal is very sensitive to environmental conditions. The risk of dropout is much higher than for code tracking. Furthermore, managing cycle slip is a difficult task. In a challenging environment (for example in an urban area), availability of phase measurements is likely to be very low, so making receivers capable of carrying out and processing phase observations very much less worthwhile.

BRIEF SUMMARY

The invention is directed toward increasing the robustness of phase measurements.

The invention proposes a radionavigation signal tracking device comprising a first tracking stage of a first radionavigation signal contained in an incoming signal to be applied to the device and a second tracking stage of a second radionavigation signal contained in the incoming signal. The first radionavigation signal is assumed to comprise a first carrier at a first frequency modulated by a first spreading waveform, while the second radionavigation signal is assumed to comprise a second carrier at a second frequency, different from the first frequency, modulated by a second spreading waveform. The first tracking stage comprises a first carrier phase-locked loop with a mixer configured to multiply the incoming signal with a local replica of the first carrier. The first carrier phase-locked loop comprises a phase discriminator of the first carrier configured to produce a first error signal arising from a first phase difference between the first carrier and the local replica of the first carrier. The first carrier phase-locked loop is configured to adjust the phase of the local replica of the first carrier on the basis of the first error signal. The second tracking stage comprises a second carrier phase-locked loop with a mixer configured to multiply the incoming signal with a local replica of the second carrier. The second carrier phase-locked loop comprises a phase discriminator of the beat between the first carrier and the second carrier configured to produce a second error signal arising from a difference between the first phase difference and a second phase difference between the second carrier and the local replica of the second carrier. The second phase-locked loop is configured to adjust the phase of the local replica of the second carrier on the basis of the first and second error signals.

It will be noted that the device according to the invention may be used for the purposes of a dual-frequency or multifrequency GNSS receiver. Instead of tracking the first and second radionavigation signals individually (i.e. using separate phase tracking loops), the tracking device of the invention uses phase-locked loops which are coupled to one another. The phase of the first radionavigation signal is tracked on the basis of the first error signal while the phase of the second radionavigation signal is tracked by using the first error signal and the second error signal which is dependent on the beat phase between the two carriers. In the present document, the term "beat" denotes the periodic variation in the amplitude of oscillation arising from the composition of two carriers. The beat signal has the frequency $|f_1-f_2|$ where $f_1$ and $f_2$ respectively represent the first and the second carrier frequency. The beat phase is dependent on the phase of each of the two carriers. It is intuitively clear that knowing the phase of one of the carriers and the beat phase makes it possible to obtain the phase of the other carrier. In the tracking device according to the invention, the phase tracking loop of the second carrier adjusts the phase of the local replica of the second carrier by using this property. One advantage of this approach is that the device according to the invention only directly tracks the phase of the first carrier. The second phase-locked loop tracks the beat, which is at a frequency ($|f_1-f_2|$) distinctly lower than the frequency of the second carrier. Since this frequency is lower, the number of phase jumps per unit time is considerably reduced relative to the carriers, which makes measurement of the beat phase highly robust. The method used by the device according to the invention thus permits more robust joint tracking of the phase of two radionavigation signals originating from the same transmitter (satellite or pseudolite).

The first phase-locked loop preferably comprises a numerically controlled oscillator (NCO), controlled by a first filter receiving the first error signal as input. The second phase-locked loop preferably comprises a numerically controlled oscillator controlled by the first filter and a second filter (of the second phase-locked loop) receiving the second error signal as input. The second filter may comprise, for example, a Kalman filter, an extended Kalman filter or a particle filter.

Preferably, the first and second radionavigation signals are selected from among Galileo E1, E5 and E6 signals or among GPS L5, L2C and L1 signals or alternatively among GLONASS L3, G2 and G1 signals. The method used by the device according to the invention is particularly advantageous if the carrier phase tracking of one of the signals is significantly more robust than the tracking of the other signal(s). In such a situation, the signal having the most robust carrier phase tracking may be selected as the first radionavigation signal. The carrier phase of the other radionavigation signals need not be tracked directly but may be identified on the basis of the beat phase. According to one advantageous embodiment of the invention, the first radionavigation signal is a Galileo E5 signal and the second radionavigation signal is a Galileo E1 signal or a Galileo E6 signal. Due to the "AltBOC" modulation of the Galileo E5 signal, the carrier phase of this signal can be more robustly tracked than that of the E1 (CBOC modulation) or E6 signal.

The first tracking stage preferably comprises a first correlator configured to correlate a local replica of the first spreading waveform with the incoming signal multiplied by the local replica of the first carrier. The phase discriminator of the first carrier may be configured so as to determine the first error signal on the basis of the correlation result produced by the first correlator.

The second tracking stage preferably comprises a second correlator configured to correlate a local replica of the second spreading waveform with the incoming signal multiplied by the local replica of the second carrier. The phase discriminator of the beat between the first carrier and the second carrier may be configured to determine the second error signal on the basis of the correlation result produced by the first correlator and the correlation result produced by the second correlator.

Preferably, the phase discriminator of the beat between the first carrier and the second carrier is configured such that it uses either the product of the correlation result provided by the first correlator and the complex conjugate of the correlation result provided by the second correlator, or the product of the complex conjugate of the correlation result produced by the first correlator and the correlation result produced by the second correlator to produce the second error signal.

The device according to the invention may be configured to process three or even more radionavigation signals jointly. In this case, a third tracking stage of a third radionavigation signal should be provided. The third radionavigation signal is assumed to comprise a third carrier at a third frequency, different from the first and second frequencies, modulated by a third spreading waveform. The third tracking stage is preferably of the same structure as the second tracking stage. It may in particular comprise a second carrier phase-locked loop with a mixer configured to multiply the incoming signal with a local replica of the second carrier. The third carrier phase-locked loop may comprise a phase discriminator of a beat between the first carrier and the third carrier configured to produce a third error signal arising from a difference between the first phase difference and a third phase difference between the third carrier and the local replica of the third carrier. The third phase-locked loop is then configured to adjust the phase of the local replica of the third carrier on the basis of the first and third error signals. The first, second and third radionavigation signals are preferably selected from among Galileo E1, E5 and E6 signals or among GPS L5, L2C and L1 signals or alternatively among GLONASS L3, G2 and G1 signals.

The third phase-locked loop preferably comprises a numerically controlled oscillator controlled by the first filter and a third filter (of the third phase-locked loop) receiving the third error signal as input. Otherwise, the numerically controlled oscillator may be controlled by the same Kalman filter, the extended Kalman filter or the particle filter which drives the numerically controlled oscillator of the second loop.

The third tracking stage preferably comprises a third correlator configured to correlate a local replica of the third spreading waveform with the incoming signal multiplied by the local replica of the third carrier. The phase discriminator of the beat between the first carrier and the third carrier may then determine the third error signal on the basis of the correlation result produced by the first correlator and the correlation result produced by the third correlator.

The phase discriminator of the beat between the first carrier and the third carrier is configured to use the product of the correlation result produced by the first correlator and of the complex conjugate of the correlation result produced by the third correlator or the product of the complex conjugate of the correlation result produced by the first correlator and of the correlation result produced by the third correlator to produce the third error signal.

It will be understood that the device according to the invention may be embodied by a digital signal processor (DSP).

One aspect of the invention relates to a GNSS receiver comprising one or more radionavigation signal tracking devices as described.

BRIEF DESCRIPTION OF THE DRAWINGS

Other distinctive features and characteristics of the invention will emerge from the detailed description of some advantageous embodiments given below by way of illustration with reference to the appended drawings, in which.

DESCRIPTION OF A PREFERRED EMBODIMENT

A radionavigation signal receiver can carry out code measurements (which are unambiguous) and phase measurements (ambiguous in terms of an integer number of cycles) on the radionavigation signals which it receives from the various satellites which are in visibility (i.e. above the horizon). A multifrequency receiver may carry out these measurements on at least two distinct carrier frequencies $f_1$ and $f_2$. Assuming a dual-frequency receiver, for each satellite in visibility and at each time step ($t_k$), there may therefore be two code measurements, notated $P_1^j(t_k)$ and $P_2^j(t_k)$, and two phase measurements, notated $\phi_1^j(t_k)$ and $\phi_2^j(t_k)$, on the frequencies $f_1$ and $f_2$, where upper index (j) indicates the transmitter (satellite or pseudolite) from which the signal arriving at the receiver originates. Since the satellites orbit the Earth, only some of them are visible at a given moment from the location of the receiver. To simplify notation, time dependence and the satellite index will not always be explicitly indicated hereafter.

The following notations will be used:

$$\lambda_1 = \frac{c}{f_1},$$

$$\lambda_2 = \frac{c}{f_2}$$

where c represents the speed of light.

The code and phase measurements satisfy the following equations (measurements on the left, model parameters on the right):

$P_1 = r + \Delta_1^{iono} + c\Delta h$ $P_2 = r + \Delta_2^{iono} + c\Delta h$ $\lambda_1 \Phi_1 = r + \lambda_1 W - \Delta_1^{iono} + c\Delta h + \lambda_1 N_1$ $\lambda_2 \Phi_2 = r + \lambda_2 W - \Delta_2^{iono} + c\Delta h + \lambda_2 N_2$ (Eq. 1)

where
- r represents the propagation distance between the satellite and the receiver, including tropospheric delay, relativistic effects, etc.;
- $\Delta_1^{iono}$ and $\Delta_2^{iono}$ describe ionospheric delay which varies approximately as a function of the square of frequency (hence $\Delta_2^{iono} \approx \Delta_1^{iono} \cdot f_1^2/f_2^2$);
- $N_1$ and $N_2$ represent (integer) phase ambiguities of the two carriers;
- W represents the contribution of the "wind-up" effect in cycles; and
- $\Delta h$ is the difference between the receiver clock and the transmitter clock.

In above system of equations, the code measurements $P_1$, $P_2$ are expressed in units of length, while the phase measurements $\phi_1$, $\phi_2$ are expressed in cycles.

The widelane combination is defined as follows:

$$\Phi_w = \Phi_1 - \Phi_2 = \frac{f_w}{c} r + N_w + f_w \Delta h - \left(\frac{1}{\lambda_1}\Delta_1^{iono} - \frac{1}{\lambda_2}\Delta_2^{iono}\right) \quad (Eq.\ 2)$$

where
- $f_w$ is the beat frequency, defined by $f_w = f_1 - f_2$ and
- $N_w$ is the widelane ambiguity defined by $N_w = N_1 - N_2$.

The beat wavelength is notated $\lambda_w = c/(f_1 - f_2) = (1/\lambda_1 - 1/\lambda_2)^{-1}$. The beat wavelength between Galileo frequencies E1 and E5 amounts, for example, to roughly 78 cm.

Figure 1:
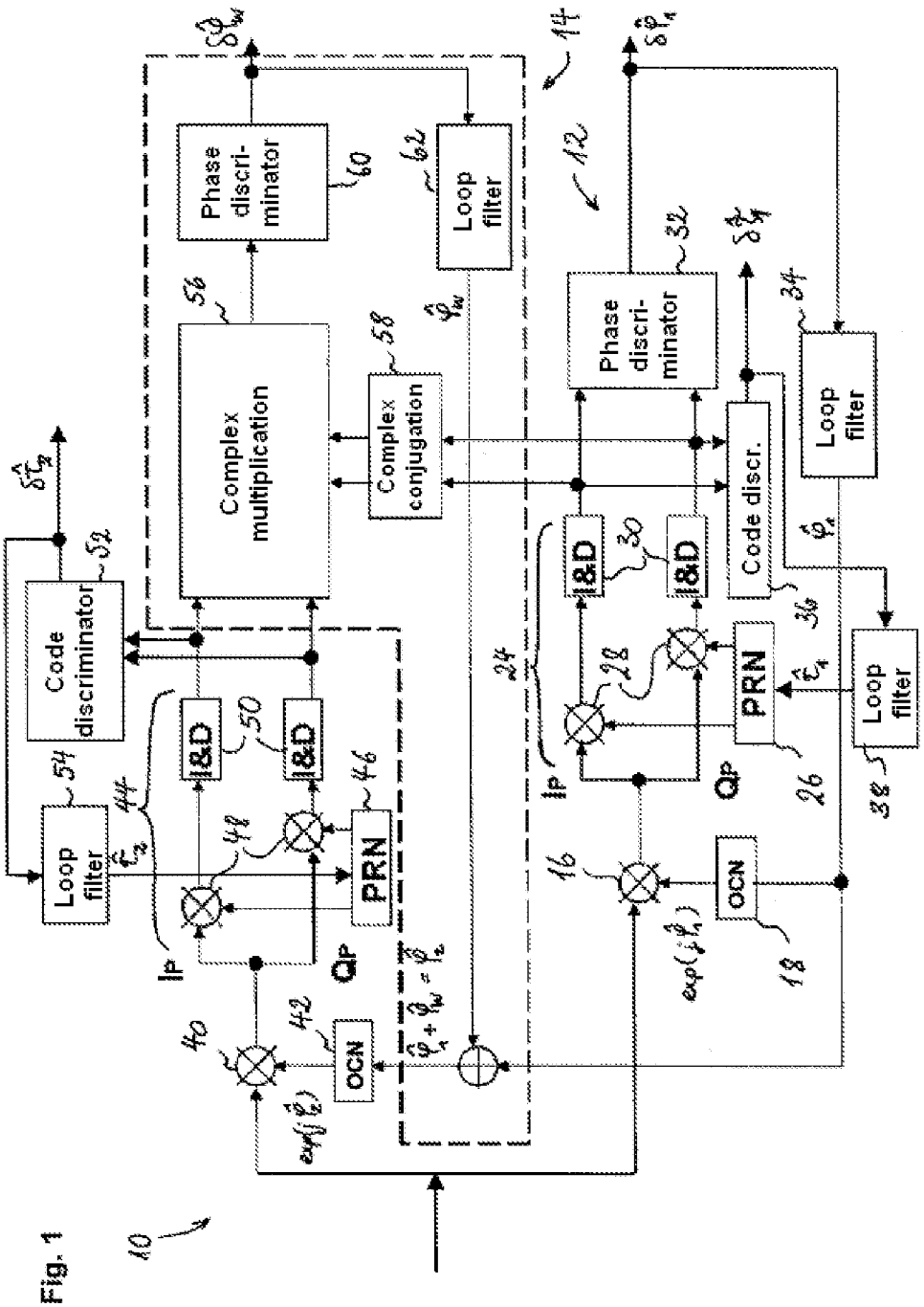
FIG. 1: is a schematic diagram of a tracking device according to a first advantageous embodiment of the invention.

FIG. 1 shows a tracking device 10 according to a preferred embodiment of the invention. The tracking device 10 comprises a first tracking stage 12 for tracking a Galileo E5 signal contained in the incoming signal and a second tracking stage 14 for tracking a Galileo E1 (or E6) signal contained in the incoming signal. By way of example, $f_1$ and $f_2$ will be used below to designate the carrier frequency of E5 and of E1, respectively.

The incoming signal comprises the radionavigation signals at frequency $f_1$ and at frequency $f_2$ transmitted by the various satellites in visibility. The signals originating from the same transmitter are processed jointly. In contrast, combined tracking of signals originating from different transmitters is not provided. A GNSS receiver therefore comprises a number of tracking devices 10 corresponding to the number of satellites (or pseudolites) which the receiver must be capable of tracking in parallel.

The first tracking stage 12 comprises a mixer 16 which multiplies the incoming signal with a local replica of the carrier E5, generated by a numerically controlled oscillator 18. In complex notation, the local replica of carrier E5 is written $\exp(2\pi \hat{f}_1 t + \hat{\phi}_1)$, where $\hat{f}_1$ is the estimate of the frequency (variable because subject to the Doppler effect) and $\hat{\phi}_1$ the estimate of the real value of the carrier phase $\phi_1$ (in radians). An "in-phase" channel, notated I, and a "quadrature-phase" channel, notated Q, are obtained at the output of the mixer 16 and are applied to a correlation stage 24.

In the correlation stage 24, channels I and Q are each multiplied by a local replica of the spreading waveform and integrated. The spreading waveform replica generators are shown in FIG. 1 as pseudo-random code replica generators 26 so as not to overcrowd the drawing. If the signal to be received contains a subcarrier (for example a BOC ("Binary Offset Carrier"), AltBOC ("alternative BOC") or other modulation), the correlation stage 24 is more complex (see for example patent FR 2,941,535). FIG. 1 is furthermore simplified in that it only shows the "prompt" correlator. The correlation stage 24 may comprise other correlators. The architecture with the highest performance comprises a "prompt" correlator, an "early" correlator and a "late" correlator.

The pseudo-random code replica which is mixed with the I and Q channels by the mixers 28 is notated $C_1(t-\hat{\tau}_1)$ where $\hat{\tau}_1$ is the estimate of the real value of the code offset $\tau_1$ and $C_1$ the function which can assume the values +1 and −1 describing the pseudo-random code. $P_1=c\hat{\tau}_1$ is obtained when the code tracking loop is picked up.

The output from the correlators 30 is used by a phase- and frequency-locked loop. A phase discriminator 32 generates an error signal indicating the residual phase error, i.e. the difference between the phase estimate $\hat{\phi}_1$ and the real value $\phi_1$. The error signal is notated $\delta\hat{\phi}_1=\phi_1-\hat{\phi}_1$. The phase discriminator may be an "a tan 2" discriminator; in this case, $\delta\hat{\phi}_1(t_k)=\text{a tan }2(Q_{P1}(t_k),I_{P1}(t_k))$, where $Q_{P1}(t_k)$ is the result of correlation on the quadrature-phase prompt channel (index "P") and $I_{P1}(t_k)$ is the result of correlation on the in-phase prompt channel. A frequency discriminator (not shown in FIG. 1) produces an error signal indicating the residual frequency error, i.e. the difference $\delta\hat{f}_1=f_1-\hat{f}_1$. The frequency discriminator may be a "cross-product" discriminator calculating $$\delta\hat{f}_1 = \frac{I_{P1}(t_{k-1})Q_{P1}(t_k) - I_{P1}(t_k)Q_{P1}(t_{k-1})}{T},$$

where $T=t_k-t_{k-1}$. A loop filter 34 receives the phase and frequency error signals and derives therefrom the control signal of the numerically controlled oscillator 18.

The output from the correlators 30 is furthermore used by a code-locked loop (or code tracking loop). A "code" discriminator 36 generates an error signal indicating the residual code offset error, i.e. the difference $\delta\hat{\tau}_1=\tau_1-\hat{\tau}_1$. This discriminator may be, for example, an "early-late normalized" discriminator which calculates:

$$\delta\hat{\tau}_1 = \delta T \cdot \frac{\sqrt{I_{E1}(t_k)^2 + Q_{E1}(t_k)^2} - \sqrt{I_{L1}(t_k)^2 + Q_{L1}(t_k)^2}}{\sqrt{I_{E1}(t_k)^2 + Q_{E1}(t_k)^2} + \sqrt{I_{L1}(t_k)^2 + Q_{L1}(t_k)^2}},$$

where $$\delta T = \left(1 - \frac{\Delta_{EL}}{2}\right),$$

with $\Delta_{EL}$ being the time offset between the early correlators and the late correlators. $I_{E1}$, $Q_{E1}$ are the outputs from the early correlators and $I_{L1}$, $Q_{L1}$ are the outputs from the late correlators. The code offset error signal is applied to a code loop filter 38 which derives therefrom the control signal of the spreading waveform generators (here represented by the code generators 26).

The second tracking stage 14 comprises a mixer 40 which multiplies the incoming signal with a local replica of the carrier E1, generated by a numerically controlled oscillator 42. In complex notation, the local replica of the carrier E1 is written $\exp(2\pi\hat{f}_2 t+\hat{\phi}_2)$, where $\hat{f}_2$ is the estimate of the frequency and $\hat{\phi}_2$ the estimate of the real value of the phase $\phi_2$ of the carrier E1 (in radians). The "in-phase" output, notated I, and the "quadrature-phase" output, notated Q, of the mixer are applied to a correlation stage 44.

In the correlation stage 44, the mixers 48 multiply each of channels I and Q with a local replica of the spreading waveform and the correlators 50 integrate the I and Q channels. The spreading waveform replica generators are shown on FIG. 1 as pseudo-random code replica generators 46. If the signal to be received contains a subcarrier (for example a BOC ("Binary Offset Carrier"), CBOC ("composite BOC") or other modulation), the correlation stage 44 is more complex (see for example patent FR 2,941,535). FIG. 1 is furthermore simplified in that it only shows the "prompt" correlator. The correlation stage 44 may comprise further correlators, in particular an "early" correlator and a "late" correlator.

The output from the correlators 50 acts as the input to a code tracking loop. A code discriminator 52 generates an error signal indicating the residual code offset error, i.e. the difference $\delta\hat{\tau}_2=\tau_2-\hat{\tau}_2$. This discriminator may be, for example, an "early-late normalized" discriminator. The code offset error signal is applied to a code loop filter 54 which derives therefrom the control signal of the spreading waveform generators (here represented by the code generators 46). The code tracking loop of the E5 and E1 signals are therefore of similar construction in this example. It should, however, be noted that the various discriminators must be selected as a function of the modulation of the radionavigation signals and a possible payload (navigation message). The various criteria for selecting the appropriate discriminators are well-known in the art and therefore need not be repeated in the present context.

The phase- and frequency-locked loop for tracking the second radionavigation signal combines the output from the prompt correlators of the first tracking stage 12 with the output from the prompt correlators of the second tracking stage 14. The output from the prompt correlators of the first tracking stage 12 is written, in complex notation, $I_{P1}(t_k)+jQ_{P1}(t_k)$, which may be represented by $A_1 \exp(j(\phi_1-\hat{\phi}_1))=A_1 \exp(j\cdot\delta\hat{\phi}_1)$. Similarly, the output from the prompt correlators of the second tracking stage 14 is written, in complex notation, $I_{P2}(t_k)+jQ_{P2}(t_k)$ which may be represented by $A_2 \exp(j(\phi_2-\hat{\phi}_2))=A_2 \exp(j\cdot\delta\hat{\phi}_2)$. The complex conjugation module 58 returns $A_1 \exp(-j\cdot\delta\hat{\phi}_1)$ and the complex multiplication module 56 therefore calculates $A_1 A_2 \exp(j\cdot(\delta\hat{\phi}_1-\delta\hat{\phi}_2))$. The parameter $\delta\hat{\phi}_1-\delta\hat{\phi}_2$, which will be notated $\delta\hat{\phi}_w$ corresponds to the beat phase between the first carrier and the second carrier.

The phase discriminator 60 generates an error signal arising from a difference between the first phase difference $\delta\hat{\phi}_1$ (or phase deviation) and the second phase difference $\delta\hat{\phi}_2$ (or phase deviation). The phase discriminator 60, which returns $\delta\hat{\phi}_w$ as error signal, may be an "a tan 2" type discriminator.

A frequency discriminator (not shown in FIG. 1) produces an error signal indicating the residual beat frequency error, i.e. the difference $\delta\hat{f}_w=f_w-\hat{f}_w$. The frequency discriminator may be a "cross-product" discriminator. A loop filter 62 receives the phase and beat frequency error signals and derives therefrom a phase and frequency correction signal to be combined with the control signal provided by the loop filter 34. The signal which controls the oscillator 42 is therefore based on the estimate of the second frequency $\hat{f}_2$, obtained by $\hat{f}_2=\hat{f}_1+\hat{f}_w$, and the phase $\hat{\phi}_2$, obtained by $\hat{\phi}_2=\hat{\phi}_1+\hat{\phi}_w$.

The outputs from discriminators 32, 36, 52 and 60 may be used by a positioning module (not shown in FIG. 1) to determine position.

Figure 2:
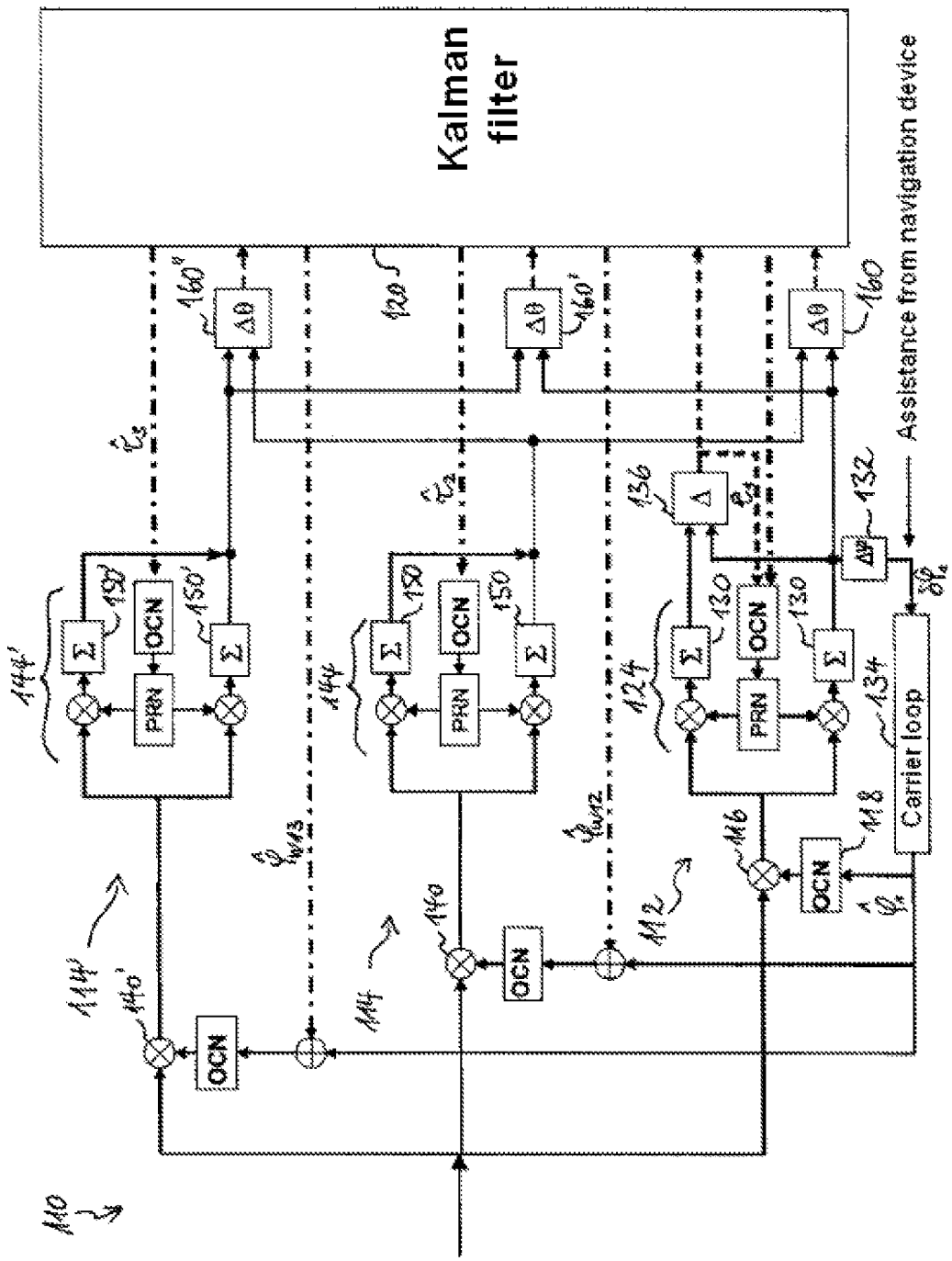
FIG. 2: is a schematic diagram of a tracking device according to a second advantageous embodiment of the invention.

FIG. 2 shows a tracking device 110 according to a second preferred embodiment of the invention. The tracking device 110 comprises a first tracking stage 112 for tracking a Galileo E5 signal, a second tracking stage 114 for tracking a Galileo E1 signal and a third tracking stage 114' for tracking a Galileo E6 signal. The frequencies of carriers E5, E1 and E6 will hereafter respectively be notated $f_1$, $f_2$ and $f_3$.

The incoming signal comprises the radionavigation signals at frequencies $f_1$, $f_2$ and $f_3$ transmitted by the various satellites in visibility. The signals originating from the same transmitter are processed jointly. In contrast, combined tracking of signals originating from different transmitters is not provided. A GNSS receiver therefore comprises a number of tracking devices 110 corresponding to the number of satellites (or pseudolites) which the receiver must be capable of tracking in parallel.

The first tracking stage 112 has essentially the same architecture as the first tracking stage of the embodiment of FIG. 1. In a mixer 116, the incoming signal is multiplied with a local replica of the carrier E5, notated $\exp(2\pi \hat{f}_1 t + \hat{\phi}_1)$, generated by a numerically controlled oscillator 118. An "in-phase" channel, notated I, and a "quadrature-phase" channel, notated Q, are obtained at the output of the mixer 116 and are applied to the first correlation stage 124.

In the first correlation stage, the I and Q channels are mixed with replicas of the spreading waveform and integrated. The correlator outputs are applied to a code discriminator, which generates un error signal indicating the residual code offset error, i.e. the difference $\delta \hat{\tau}_1 = \tau_1 - \hat{\tau}_1$. A code tracking loop filter (not shown) derives therefrom the estimate $\hat{\tau}_1$ of the code offset and uses it to control a numerically controlled oscillator, which in turn provides the clock signal which drives the spreading waveform replica generators.

The output from the correlators 130 ($A_1 \exp(j(\phi_1-\hat{\phi}_1)) = A_1 \exp(j \cdot \delta \hat{\phi}_1)$ in complex notation) is also used by a phase discriminator 132, which generates an error signal indicating the residual phase error, i.e. the difference between the estimate $\hat{\phi}_1$ of the phase and the real value $\phi_1$. A frequency discriminator (not shown in FIG. 2) produces an error signal indicating the residual frequency error, i.e. the difference $\delta \hat{f}_1 = f_1 - \hat{f}_1$. A loop filter 134 receives the phase and frequency error signals and derives therefrom the control signal of the numerically controlled oscillator 118. Optionally, an assistance signal from the navigation device (dependent on the speed and/or acceleration of the receiver) may be applied to the carrier tracking loop to increase the robustness of pickup.

In the second tracking stage 114, the incoming signal is mixed in a mixer 140 with a local replica of the carrier E1, notated $\exp(2\pi \hat{f}_2 t + \hat{\phi}_2)$. The I and Q channels obtained in this manner are then correlated with a replica of the spreading waveform. The output from the correlators 150 ($A_2 \exp(j(\phi_2-\hat{\phi}_2)) = A_2 \exp(j \cdot \delta \hat{\phi}_2)$ in complex notation) is combined with the output from the correlators 130 by a discriminator 160 of the beat phase between the first and the second carriers. The phase discriminator 160 generates an error signal arising from a difference between the first phase difference $\delta \hat{\phi}_1$ and the second phase difference $\delta \hat{\phi}_2$. The phase discriminator 160 returns $\delta \hat{\phi}_{w12} = \delta \hat{\phi}_1 - \delta \hat{\phi}_2$ as error signal. The second tracking stage 114 furthermore comprises a frequency discriminator (not shown) which produces an error signal indicating the beat frequency error between the first and the third carriers, i.e. the difference $\delta \hat{f}_{w12} = f_{w12} - \hat{f}_{w12}$, with $f_{w12} = f_1 - f_2$.

The third tracking stage 114' is of similar construction to the second tracking stage 114. In the third tracking stage 114', the incoming signal is mixed in a mixer 140' with a local replica of the carrier E6, notated $\exp(2\pi \hat{f}_3 t + \hat{\phi}_3)$. The I and Q channels obtained in this manner are then correlated with a replica of the spreading waveform. The output from the correlators 150' ($A_3 \exp(j(\phi_3-\hat{\phi}_3)) = A_3 \exp(j \cdot \delta \hat{\phi}_3)$ in complex notation) is combined with the output from the correlators 130 by a discriminator 160' of the beat phase between the first and the third carriers. The phase discriminator 160' generates an error signal arising from a difference between the first phase difference $\delta \hat{\phi}_1$ and the third phase difference $\delta \hat{\phi}_3$. The phase discriminator 160' returns $\delta \hat{\phi}_{w13} = \delta \hat{\phi}_1 - \delta \hat{\phi}_3$ as error signal. The third tracking stage 114' furthermore comprises a frequency discriminator (not shown) which produces an error signal indicating the beat frequency error between the first and the third carriers, i.e. the difference $\delta \hat{f}_{w13} = f_{w13} - \hat{f}_{w13}$, with $f_{w13} = f_1 - f_3$.

The output from the correlators 150' ($A_3 \exp(j(\phi_3-\hat{\phi}_3)) = A_3 \exp(j \cdot \delta \hat{\phi}_3)$ in complex notation) is furthermore combined with the output from the correlators 150 by a discriminator 160'' of the beat phase between the second and the third carriers. The phase discriminator 160'' generates an error signal arising from a difference between the second phase difference $\delta \hat{\phi}_2$ and the third phase difference $\delta \hat{\phi}_3$. The phase discriminator 160'' therefore returns $\delta \hat{\phi}_{w23} = \delta \hat{\phi}_2 - \delta \hat{\phi}_3$ as error signal. A frequency discriminator (not shown) which produces an error signal indicating the beat frequency error between the second and the third carriers, i.e. the difference $\delta \hat{f}_{w23} = f_{w23} - \hat{f}_{w23}$, with $f_{w23} = f_2 - f_3$, may also be provided.

The outputs from discriminators 136, 160, 160', 160'' and from the frequency discriminators (not shown) are processed in an extended Kalman filter 120. The measurement vector applied to the extended Kalman filter 120 may therefore be written: $z = [c \delta \hat{\tau}_1, \delta \hat{\phi}_{w12}, \delta \hat{f}_{w12}, \delta \hat{\phi}_{w13}, \delta \hat{f}_{w13}, \delta \hat{\phi}_{w23}, \delta \hat{f}_{w23}]^T$. The output obtained from the extended Kalman filter is the state vector: $x = [\delta \hat{\rho}_\tau, \delta \hat{\rho}_\phi, \delta \hat{\dot{\rho}}, \delta \hat{\ddot{\rho}}]^T$, where $\delta \hat{\rho}_\tau$ denotes the estimated change in the pseudodistance between the satellite and the receiver since the previous time step, $\delta \hat{\rho}_\phi$ the estimated change, with the ambiguity regarding the integer number of cycles, in the pseudodistance between the satellite and the receiver since the previous time step, $\delta \hat{\dot{\rho}}$ the estimated change in the relative speed between the satellite and the receiver since the previous time step and $\delta \hat{\ddot{\rho}}$ the estimated change in relative acceleration between the satellite and the receiver since the previous time step. Using the notation $X = [\hat{\rho}_\tau, \hat{\rho}_\phi, \hat{\dot{\rho}}, \hat{\ddot{\rho}}]^T$, the update rule may be stated as: $X_k = F X_{k-1} + x_k$, where $F$ denotes the transition matrix (dependent on the model) and k is the time step index. The estimate of the delay to code $\hat{\tau}_1$ is obtained by $\hat{\tau}_1 = \hat{\rho}_\tau / c$, $\hat{\tau}_2$ by $\hat{\tau}_2 = \hat{\rho}_\tau / c$, $\hat{\tau}_3$ by $\hat{\tau}_3 = \hat{\rho}_\tau / c$, $\hat{f}_{w12}$ by $\hat{f}_{w12} = \hat{\rho}_\tau / \lambda_{w12}$, $\hat{\phi}_{w12}$ by $\hat{\phi}_{w12} = \hat{\rho}_\phi \cdot 2\pi / \lambda_{w12}$, $\hat{f}_{w13}$ by $\hat{f}_{w13} = \hat{\rho}_\tau / \lambda_{w13}$ and $\hat{\phi}_{w13}$ by $\hat{\phi}_{w13} = \hat{\rho}_\phi \cdot 2\pi / \lambda_{w13}$. These outputs are used to control the NCOs of the tracking device 110.

Figure 3:
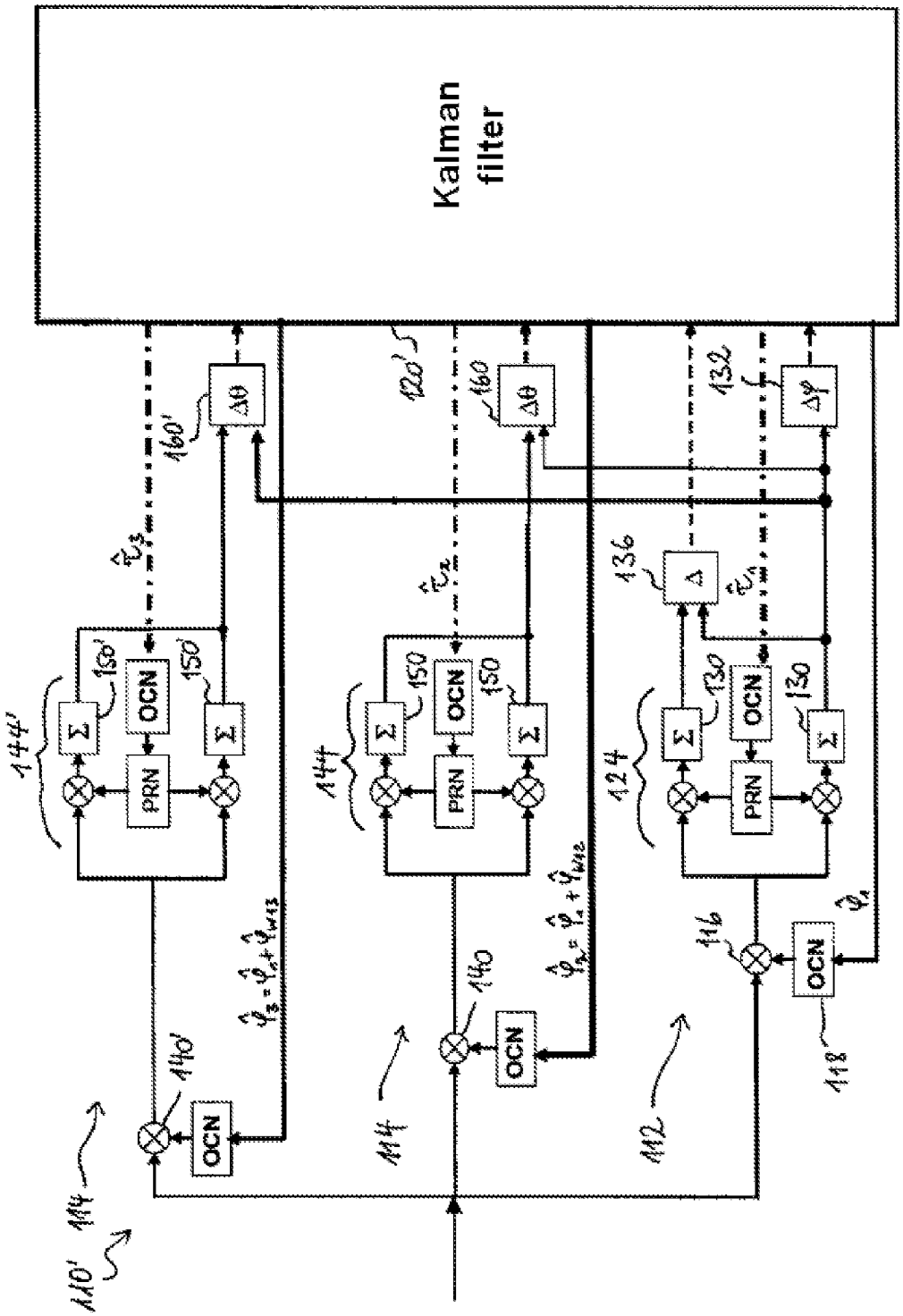
FIG. 3: is a schematic diagram of a variant of the tracking device of FIG. 2.

FIG. 3 shows a variant 110' of the tracking device of FIG. 2. The same reference numerals have therefore been used to denote identical components. According to the variant of FIG. 3, the extended Kalman filter outputs the control signals for all the code tracking and carrier loops. The measurement vector applied to the extended Kalman filter 120' may be written: $z = [c \delta \hat{\tau}_1, \delta \hat{\phi}_1, \delta \hat{f}_1, \delta \hat{\phi}_{w12}, \delta \hat{f}_{w12}, \delta \hat{\phi}_{w13}, \delta \hat{f}_{w13}]^T$. The state vector is: $x = [\delta \hat{\rho}_\tau, \delta \hat{\rho}_\phi, \delta \hat{\dot{\rho}}, \delta \hat{\ddot{\rho}}]^T$, where $\delta \hat{\rho}_\tau$ denotes the estimated change in the pseudodistance between the satellite and the receiver since the previous time step, $\delta \hat{\rho}_\phi$ the estimated change, with the ambiguity regarding the integer number of cycles, in the pseudodistance between the satellite and the receiver since the previous time step, $\delta \hat{\dot{\rho}}$ the estimated change in the relative speed between the satellite and the receiver since the previous time step and $\delta \hat{\ddot{\rho}}$ the estimated change in relative acceleration between the satellite and the receiver since the previous time step. Using the notation $X=[\hat{\rho}_\tau,\hat{\rho}_\phi,\dot{\hat{\rho}},\dot{\hat{\delta\rho}}]^T$, the update rule may be stated as: $X_k=FX_{k-1}+x_k$, where F denotes the transition matrix (dependent on the model) and k is the time step index. The estimate of the delay to code $\hat{\tau}_1$ is obtained by $\hat{\tau}_1$ by $\hat{\tau}_1=\hat{\rho}_\tau/c$, $\hat{\tau}_2$ by $\hat{\tau}_2=\hat{\rho}_\tau/c$, $\hat{\tau}_3$ by $\hat{\tau}_3=\hat{\rho}_\tau/c$, $\hat{f}_{w12}$ by $\hat{f}_{w12}=\dot{\hat{\rho}}_\tau/\lambda_{w12}$, $\hat{\phi}_{w12}$ by $\hat{\phi}_{w12}=\hat{\rho}_\phi\cdot 2\pi/\lambda_{w12}$, $\hat{f}_{w13}$ by $\hat{f}_{w13}=\dot{\hat{\rho}}_\tau/\lambda_{w13}$ and $\hat{\phi}_{w13}$ by $\hat{\phi}_{w13}=\hat{\rho}_\phi\cdot 2\pi/\lambda_{w13}$. These outputs are used to control the NCOs of the tracking device 110'.

Figure 4:
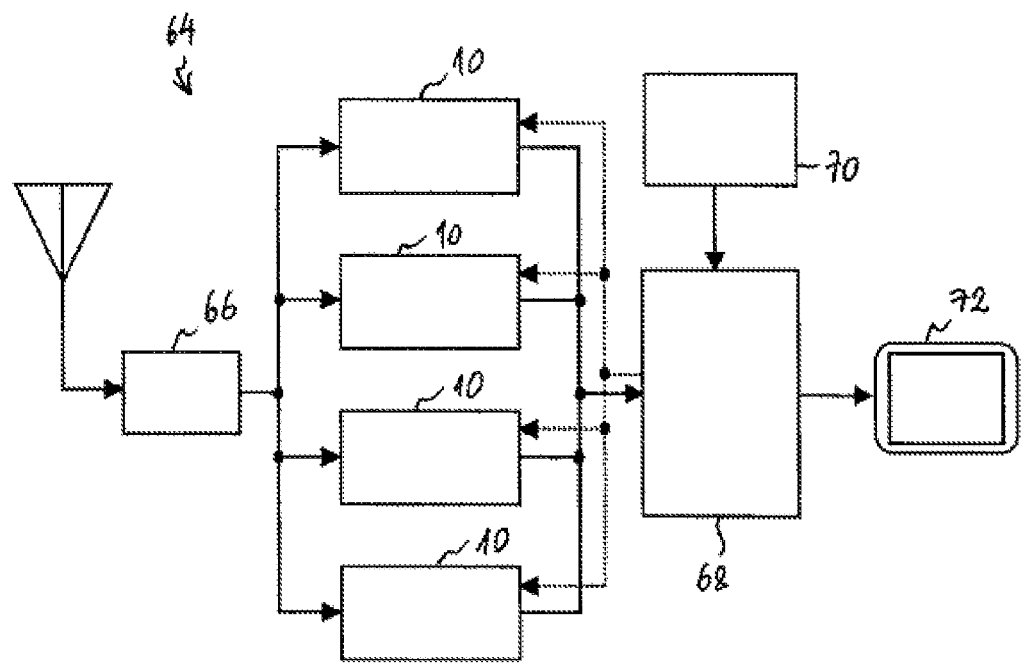
FIG. 4: is a schematic diagram of a GNSS receiver comprising tracking devices according to the invention.

FIG. 4 shows, highly schematically, a GNSS receiver 64 comprising a plurality of tracking devices 10 (or 110 or 110'). Each tracking device 10 receives the incoming signal, frequency transposed (for example to baseband) and digitized by an HF head 66 ("RF front end") and tracks the signals from a satellite (or pseudolite) in visibility from the receiver. The measurements made by the tracking devices 10 are combined by a positioning module 68 which derives therefrom the position of the receiver, the speed, possibly acceleration, and time by solving the navigation equation system. The receiver 64 shown also comprises an inertial navigation device 70, the measurements from which are also used by the positioning module 68. PST (position, speed, time) data can be displayed to the user by means of a display device 72 (for example on a map). The positioning module 68 optionally also supplies the tracking devices 10 with an assistance signal which the first carrier loop filter can use to enhance tracking of the phase and the frequency of the first carrier.

The invention claimed is:

1. A radionavigation signal tracking device comprising a first tracking stage of a first radionavigation signal contained in an incoming signal to be applied to the device, the first radionavigation signal comprising a first carrier at a first frequency modulated by a first spreading waveform, said first tracking stage comprising a first carrier phase-locked loop with a mixer configured to multiply the incoming signal with a local replica of the first carrier, the first carrier phase-locked loop comprising a phase discriminator of the first carrier configured to produce a first error signal arising from a first phase difference between the first carrier and the local replica of the first carrier, the first carrier phase-locked loop being configured to adjust the phase of the local replica of the first carrier on the basis of the first error signal;

a second tracking stage of a second radionavigation signal contained in the incoming signal, the second radionavigation signal comprising a second carrier at a second frequency, different from the first frequency, modulated by a second spreading waveform, the second tracking stage comprising a second carrier phase-locked loop with a mixer configured to multiply the incoming signal with a local replica of the second carrier, wherein the second carrier phase-locked loop comprises a phase discriminator of a beat phase between the first carrier and the second carrier configured to produce a second error signal arising from a difference between the first phase difference and a second phase difference between the second carrier and the local replica of the second carrier; and wherein the second phase-locked loop is configured to adjust the phase of the local replica of the second carrier on the basis of the first and second error signals.

2. The device according to claim 1, in which the first phase-locked loop comprises a numerically controlled oscillator controlled by a first filter receiving the first error signal as input.

3. The device according to claim 2, in which the second phase-locked loop comprises a numerically controlled oscillator controlled by the first filter and a second filter receiving the second error signal as input.

4. The device according to claim 3, in which the second filter comprises a Kalman filter, an extended Kalman filter or a particle filter.

5. The device according to claim 1, in which the first and second radionavigation signals are selected from among Galileo E1, E5 and E6 signals or among GPS L5, L2C and L1 signals or among GLONASS L3, G2 and G1 signals.

6. The device according to claim 1, in which the first radionavigation signal is a Galileo E5 signal and in which the second radionavigation signal is a Galileo E1 signal or Galileo E6 signal.

7. The device according to claim 1, in which the first tracking stage comprises a first correlator configured to correlate a local replica of the first spreading waveform with the incoming signal multiplied by the local replica of the first carrier, and in which the phase discriminator of the first carrier determines the first error signal on the basis of a correlation result produced by the first correlator.

8. The device according to claim 7, in which the second tracking stage comprises a second correlator configured to correlate a local replica of the second spreading waveform with the incoming signal multiplied by the local replica of the second carrier, and in which the phase discriminator of the beat between the first carrier and the second carrier determines the second error signal on the basis of the correlation result produced by the first correlator and a correlation result produced by the second correlator.

9. The device according to claim 8, in which the phase discriminator of the beat between the first carrier and the second carrier is configured to use the product of the correlation result produced by the first correlator and of the complex conjugate of the correlation result produced by the second correlator or the product of the complex conjugate of the correlation result produced by the first correlator and of the correlation result produced by the second correlator to produce the second error signal.

10. The device according to claim 9, comprising a third tracking stage of a third radionavigation signal contained in the incoming signal, the third radionavigation signal comprising a third carrier at a third frequency, different from the first and second frequencies, modulated by a third spreading waveform, the third tracking stage comprising a third carrier phase-locked loop with a mixer configured to multiply the incoming signal with a local replica of the third carrier, the third carrier phase-locked loop comprising a phase discriminator of a beat between the first carrier and the third carrier configured to produce a third error signal arising from a difference between the first phase difference and a third phase difference between the third carrier and the local replica of the third carrier;

and the third phase-locked loop being configured to adjust the phase of the local replica of the third carrier on the basis of the first and third error signals.

11. The device according to claim 10, in which the third phase-locked loop comprises a numerically controlled oscillator controlled by the first filter and a third filter receiving the third error signal as input.

12. The device according to claim 10, in which the second filter comprises a Kalman filter, an extended Kalman filter or a particle filter; and in which the third phase-locked loop comprises a numerically controlled oscillator controlled by the Kalman filter, the extended Kalman filter or the particle filter.

13. The device according claim 10, in which the third tracking stage comprises a third correlator configured to correlate a local replica of the third spreading waveform with the incoming signal multiplied by the local replica of the third carrier, and in which the phase discriminator of the beat between the first carrier and the third carrier determines the third error signal on the basis of the correlation result produced by the first correlator and of a correlation result produced by the third correlator.

14. The device according to claim 13, in which the phase discriminator of the beat between the first carrier and the third carrier is configured to use the product of the correlation result produced by the first correlator and of the complex conjugate of the correlation result produced by the third correlator or the product of the complex conjugate of the correlation result produced by the first correlator and of the correlation result produced by the third correlator to produce the third error signal.

15. The device according to claim 1 embodied by a digital signal processor.

16. A GNSS receiver comprising one or more radionavigation signal tracking devices according to claim 1.

17. A positioning and/or dating device including a GNSS receiver according to claim 16.

18. The device according to claim 1, comprising a third tracking stage of a third radionavigation signal contained in the incoming signal, the third radionavigation signal comprising a third carrier at a third frequency, different from the first and second frequencies, modulated by a third spreading waveform, the third tracking stage comprising a third carrier phase-locked loop with a mixer configured to multiply the incoming signal with a local replica of the third carrier, the third carrier phase-locked loop comprising a phase discriminator of a beat between the first carrier and the third carrier configured to produce a third error signal arising from a difference between the first phase difference and a third phase difference between the third carrier and the local replica of the third carrier;

and the third phase-locked loop being configured to adjust the phase of the local replica of the third carrier on the basis of the first and third error signals.

19. A radionavigation signal tracking device comprising a first tracking stage of a first radionavigation signal contained in an incoming signal to be applied to the device, the first radionavigation signal comprising a first carrier at a first frequency modulated by a first spreading waveform, said first tracking stage comprising a first carrier phase-locked loop with a mixer configured to multiply the incoming signal with a local replica of the first carrier, the first carrier phase-locked loop comprising a phase discriminator of the first carrier configured to produce a first error signal arising from a first phase difference between the first carrier and the local replica of the first carrier, the first carrier phase-locked loop being configured to adjust the phase of the local replica of the first carrier on the basis of the first error signal;

a second tracking stage of a second radionavigation signal contained in the incoming signal, the second radionavigation signal comprising a second carrier at a second frequency, different from the first frequency, modulated by a second spreading waveform, the second tracking stage comprising a second carrier phase-locked loop with a mixer configured to multiply the incoming signal with a local replica of the second carrier, wherein the second carrier phase-locked loop comprises a phase discriminator of a beat between the first carrier and the second carrier configured to produce a second error signal arising from a difference between the first phase difference and a second phase difference between the second carrier and the local replica of the second carrier;

wherein the second phase-locked loop is configured to adjust the phase of the local replica of the second carrier on the basis of the first and second error signals;

further comprising a third tracking stage of a third radionavigation signal contained in the incoming signal, the third radionavigation signal comprising a third carrier at a third frequency, different from the first and second frequencies, modulated by a third spreading waveform, the third tracking stage comprising a third carrier phase-locked loop with a mixer configured to multiply the incoming signal with a local replica of the third carrier, the third carrier phase-locked loop comprising a phase discriminator of a beat between the first carrier and the third carrier configured to produce a third error signal arising from a difference between the first phase difference and a third phase difference between the third carrier and the local replica of the third carrier;

and the third phase-locked loop being configured to adjust the phase of the local replica of the third carrier on the basis of the first and third error signals.

* * * * *